No. 680,621. Patented Aug. 13, 1901.
J. D. ROCKWELL.
DISINFECTING DEVICE.
(Application filed May 13, 1901.)
(No Model.)
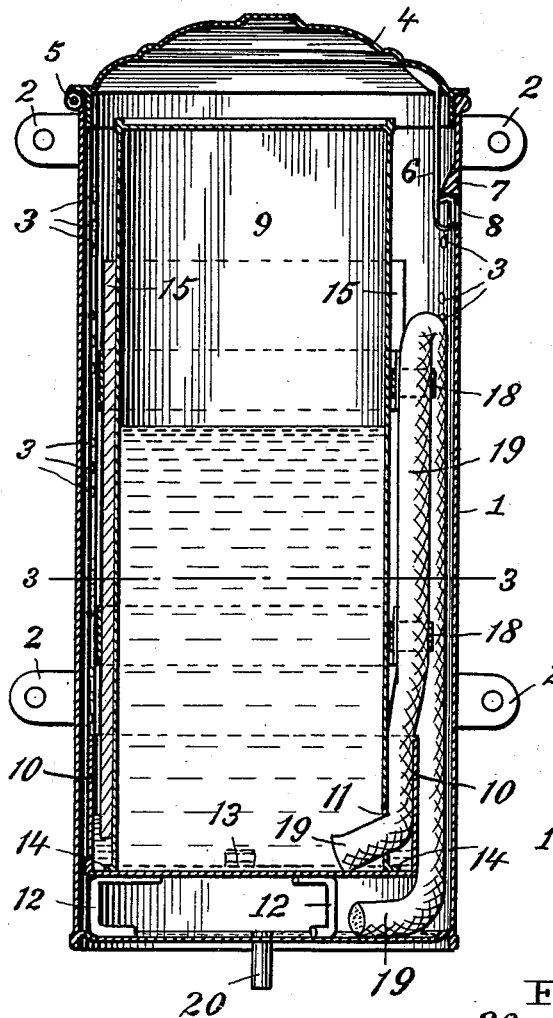
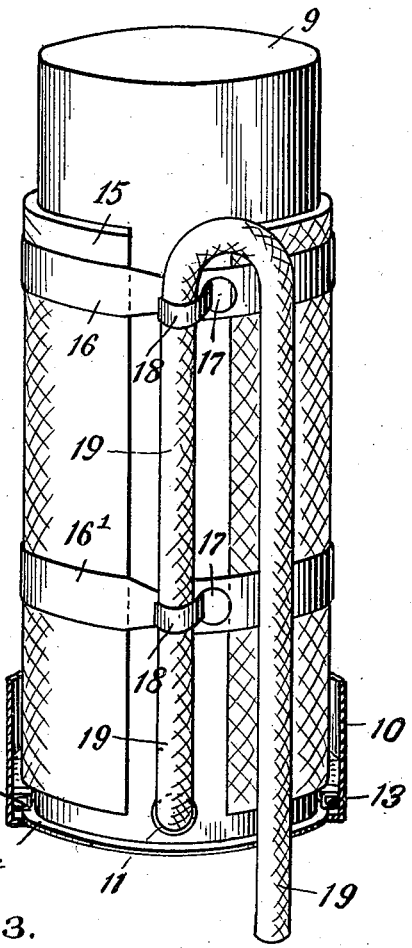
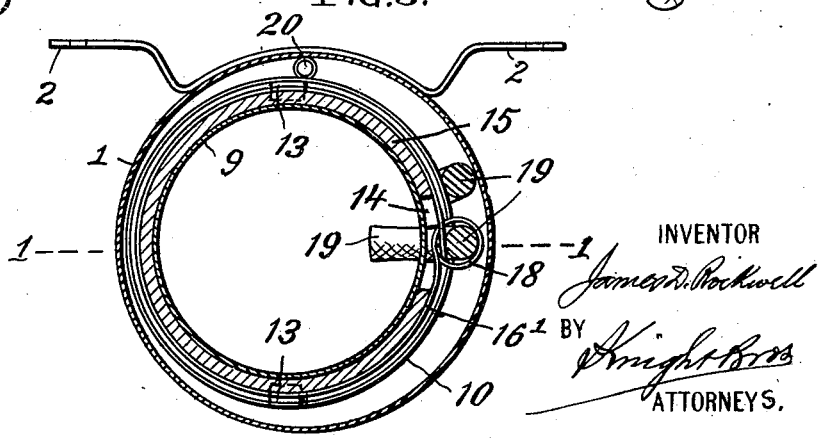
WITNESSES:
INVENTOR
James D. Rockwell
BY
Knight Bros
ATTORNEYS.
THE NORRIS PETERS CO., PHOTO-LITHO., WASHINGTON, D. C.

UNITED STATES PATENT OFFICE.

JAMES D. ROCKWELL, OF NEW YORK, N. Y.

DISINFECTING DEVICE.

SPECIFICATION forming part of Letters Patent No. 680,621, dated August 13, 1901.

Application filed May 13, 1901. Serial No. 60,110. (No model.)

*To all whom it may concern:*

Be it known that I, JAMES D. ROCKWELL, a citizen of the United States, and a resident of the borough of Manhattan, in the city and State of New York, have invented a new and useful Improvement in Disinfectors for Urinals and the Like, of which the following is a specification.

My invention relates to the well-known class of disinfectors for urinals which are constructed with a reservoir for disinfecting liquid operating on the "bird-fountain" principle to maintain in a surrounding pan or seal-chamber a shallow body of the liquid from which the liquid is carried up by a capillary body for evaporation and also by a wick acting on the principle of a siphon to supply a constant and variable drip of disinfecting liquid, which drops into the urinal or other place requiring to be deodorized.

The objects of my invention are to produce an improved and effective disinfecting apparatus of the general character referred to at reduced cost, simple in construction, and easily manipulated and regulated.

To this end my invention consists in improvements in the manner of securing the capillary wicking around the exterior of the reservoir, providing for the vertical adjustment of the siphon-wick, and in other details hereinafter described and claimed.

In the accompanying drawings, Figure 1 is vertical section of the apparatus on the line 1 1, Fig. 3. Fig. 2 is a perspective view of the internal reservoir, showing the evaporating and sealing pan in section. Fig. 3 is a horizontal section on the line 3 3, Fig. 1.

The outer casing 1 is provided with ears or lugs 2 for attachment to the wall in usual manner and with numerous holes 3 for the passage of vapor from the disinfecting liquid. The cover 4 of the casing is hinged at 5 and provided at the other side with a spring-catch 6, which in closing engages beneath a lug 7 on the interior of the casing, from which it may be released by a pointed instrument inserted through a hole 8 provided for the purpose.

Within the casing 1 is contained the liquid-reservoir 9, which has an air-tight top and an open bottom which is set in a sealing-pan 10, in which a shallow body of liquid from the reservoir is maintained at uniform height by atmospheric pressure, liquid being supplied from the reservoir on the well-known bird-fountain principle as evaporation occurs. The liquid passes through an opening 11 in the side of the reservoir, rising in the pan 10 to the level of the top of said opening.

The pan 10 is provided with legs 12, which rest on the bottom of the outer case 1. In order to hold the reservoir 9 firmly in position in the pan 10 and permit its ready removal for filling, I provide two opposite lugs 13 on the bottom of the pan, catching over an outturned flange 14 on the lower margin of the reservoir. The connection is easily effected by first inserting the flange 14 beneath one of the lugs 13 and then pressing in the opposite side of the reservoir, causing it to catch under the opposite lug.

The reservoir 9 is partially surrounded by a wick 15, of capillary material, which may be economically made in flat form and is secured in position in simple and novel manner by means of bands 16 16', made of common tin or other flexible sheet metal, having a hole 17 near one end and the other end reduced in width, so that it is passed through the hole 17 and then coiled or bent to form an eye or loop 18, as shown in Figs. 2 and 3, through which eyes the siphon-wick 19 is inserted to support it in position and at any desired height. One end of the wick 19 is inserted through the discharge-aperture 11 into the interior of the reservoir 9, while the other end rests on the bottom of the casing 1, as shown in Fig. 1, so as to gradually deposit therein disinfecting liquid, which is discharged through a drip-spout 20 to the urinal or other place to be deodorized. The drip-spout 20 projects a short distance above the floor of the casing 1, so as to maintain thereon a shallow body of liquid, from the surface of which disinfecting-vapor rises, mingling with that evaporated from the capillary wick 15. The rapidity of discharge from the drip-spout 20 is regulated as occasion requires by adjusting the height of the upper supporting-band 16, so as to change the height of the bend of the siphon-wick 19.

In operation the wick 15, having its lower end immersed in liquid in the pan 10, is kept saturated with disinfecting liquid, which evaporates from the exposed surface of the said wick, as well as from the surface of the siphon-wick 19 and the liquid on the bottom of the casing 1, and escapes through the casing-apertures 3 into the atmosphere.

Having thus described my invention, the following is what I claim as new therein and desire to secure by Letters Patent:

1. In a disinfector for urinals and the like, the combination of the reservoir 9 having a tight top and an apertured bottom; the sealing-pan 10 in which the apertured bottom of the reservoir is contained; a wick 15 of capillary material wrapped around the reservoir 9 and extending downward within the sealing-pan 10 and movable bands 16, 16'; by which the wick 15 is confined in position on the reservoir 9, substantially as set forth.

2. The combination of the reservoir 9; the wick 15 applied to the outside of said reservoir; the vertically-adjustable band 16 encircling the wick on the reservoir; and the siphon-wick 19 supported adjustably by the band 16, substantially as set forth.

3. The combination of the reservoir 9; the capillary wick 15 applied to the outside of said reservoir; the vertically-adjustable band 16 encircling said wick having an aperture 17 near one end and with the other end passed through said aperture and bent to form an eye 18; and the siphon-wick 19 passed through the eye 18 to support it in position, substantially as set forth.

4. The combination of the reservoir 9 having a tight top and an apertured bottom and an outturned bottom flange 14; the sealing-pan 10 in which the lower end of the reservoir is contained, having catches 13 engaging with the flange 14; and a capillary wick 15 confined on the outside of the reservoir 9 and extending downward within the sealing-pan 10, substantially as set forth.

JAMES D. ROCKWELL.

Witnesses:
JOSIAH H. PECK,
MARTHA L. CHRISTIE.